(12) United States Patent
Harleman (10) Patent No.: US 10,351,224 B2
(45) Date of Patent: Jul. 16, 2019

(54) EXTERNAL STRUCTURE MOUNTING SYSTEM FOR USE WITH AN AIRCRAFT

(71) Applicant: THE BOEING COMPANY, Huntington Beach, CA (US)

(72) Inventor: Thomas J. Harleman, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 891 days.

(21) Appl. No.: 14/862,779

(22) Filed: Sep. 23, 2015

(65) Prior Publication Data
US 2017/0081016 A1    Mar. 23, 2017

(51) Int. Cl.
*B64C 7/00* (2006.01)

(52) U.S. Cl.
CPC ........................ *B64C 7/00* (2013.01)

(58) Field of Classification Search
CPC .................... B64C 7/00; B64D 27/26
USPC .................... 244/118.1, 118.5, 131
See application file for complete search history.

(56) References Cited

U.S. PATENT DOCUMENTS

| 7,198,226 | B2 | 4/2007 | Muylaert et al. | |
|---|---|---|---|---|
| 7,467,789 | B2 | 12/2008 | Rawdon | |
| 8,844,866 | B2 * | 9/2014 | De Azevedo | B64D 7/00 244/118.5 |
| 2001/0014278 | A1 * | 8/2001 | Maffeis | F15B 15/1404 414/749.1 |
| 2003/0025033 | A1 * | 2/2003 | Levert | B64D 27/26 244/54 |
| 2005/0269445 | A1 * | 12/2005 | Chevalier | B64D 27/26 244/54 |
| 2007/0138337 | A1 * | 6/2007 | Audart-Noel | B64D 27/26 244/53 R |
| 2007/0205327 | A1 * | 9/2007 | Gioffre | B64D 47/08 244/118.1 |
| 2010/0127118 | A1 * | 5/2010 | Combes | B64D 27/26 244/54 |
| 2010/0147997 | A1 * | 6/2010 | Martinou | B64D 27/26 244/54 |
| 2013/0305817 | A1 * | 11/2013 | Magnin | B64D 27/26 73/117.03 |
| 2015/0166188 | A1 * | 6/2015 | Lin | B64D 27/26 244/54 |
| 2015/0166192 | A1 * | 6/2015 | Ewens | B64D 27/26 244/54 |
| 2015/0197341 | A1 * | 7/2015 | Ewens | B64D 27/26 244/54 |

(Continued)

*Primary Examiner* — Joseph W Sanderson
*Assistant Examiner* — Aaron M Rodziwicz
(74) *Attorney, Agent, or Firm* — Armstrong Teasdale LLP (57) ABSTRACT

A mounting system for mounting an external structure to an aircraft includes a plurality of first mounting structures coupled to the aircraft and at least one link coupled to each first mounting structure of the plurality of mounting structures. The mounting system also includes a second mounting structure positioned proximate the at least one link, wherein the second mounting structure includes at least one aperture defined therein. An eccentric bearing is positioned in the at least one aperture and is configured to couple the second mounting structure to the at least one link. The eccentric bearing includes a bore extending therethrough that is offset from an axial center of the eccentric bearing.

20 Claims, 7 Drawing Sheets

(56) References Cited

U.S. PATENT DOCUMENTS

2016/0122029 A1* 5/2016 Serra .................. B64D 27/26
244/54

* cited by examiner

EXTERNAL STRUCTURE MOUNTING SYSTEM FOR USE WITH AN AIRCRAFT

BACKGROUND

The present disclosure relates generally to aircraft having external structures and, more particularly, to mounting system systems and methods for coupling external structures to aircraft.

At least some known aircraft include external structures coupled thereto for a variety of purposes. For example, such external structures may be coupled to the aircraft fuselage, wings, or empennage and used to carry sensor equipment, fuel, or other cargo. Prior methods of coupling external structures to an aircraft rely on either high-precision placement of match-drilled holes for mounting, which prevents easy removal and reinstallation or replacement, or the use of adjustable length tie rods, which have a limited loading capability and, in some applications, may include adjustment components too large to fit within the space allotted. Additionally, manufacturing tolerances associated with such prior methods are both time consuming and expensive to implement.

BRIEF DESCRIPTION

In one aspect, a mounting system for mounting an external structure to an aircraft is provided. The mounting system includes a plurality of first mounting structures coupled to the aircraft and at least one link coupled to each first mounting structure of the plurality of mounting structures. The mounting system also includes a second mounting structure positioned proximate the at least one link, wherein the second mounting structure includes at least one aperture defined therein. An eccentric bearing is positioned in the at least one aperture and is configured to couple the second mounting structure to the at least one link. The eccentric bearing includes a bore extending therethrough that is offset from an axial center of the eccentric bearing.

In another aspect, an aircraft is provided. The aircraft includes a support structure, an external structure, and a mounting system configured to couple the external structure to the support structure. The mounting system includes a plurality of first mounting structures coupled to the support structure and at least one link coupled to each first mounting structure of the plurality of first mounting structures. A second mounting structure is coupled to the external structure and positioned proximate the at least one link, wherein the second mounting structure includes at least one aperture defined therein. The mounting system also includes an eccentric bearing positioned in the at least one aperture and configured to couple the second mounting structure to the at least one link. The eccentric bearing includes a bore extending therethrough that is offset from an axial center of the eccentric bearing.

In yet another aspect, a method of coupling an external structure to an aircraft using a mounting system is provided. The method includes coupling a plurality of first mounting structures to the aircraft and coupling at least one link to each of the plurality of first mounting structures, wherein the at least one link includes a link opening. The method also includes positioning a second mounting structure proximate the at least one link, wherein the second mounting structure is coupled to the external structure, and wherein the second mounting structure includes at least one aperture defined therein. An eccentric bearing is then inserted into the at least one aperture, wherein the eccentric bearing includes a bore defined therethrough. The method also includes rotating the eccentric bearing to align the bore with the link opening.

DETAILED DESCRIPTION

The implementations described herein include a mounting system for use in coupling an external structure, such as a sensor package, to an aircraft support structure, such as a keel beam, bulkhead, or wing rib. The mounting system includes a plurality of first mounting structures coupled to the aircraft and at least one link coupled to each first mounting structure of the plurality of mounting structures. The mounting system also includes a second mounting structure positioned proximate the at least one link, wherein the second mounting structure includes at least one aperture defined therein. The aperture is designed to align with a link opening to facilitate coupling the link and the second mounting structure, but, due to manufacturing limitations, the links may be slightly different sizes and, therefore, fall outside the acceptable tolerances ranges. An eccentric bearing is positioned in the at least one aperture and is configured to couple the second mounting structure to the at least one link. The eccentric bearing includes a bore extending therethrough that is offset from an axial center of the eccentric bearing such that when the eccentric bearing is rotated within the aperture, the bore aligns with the link opening and enables coupling of the second mounting structure with the links within the required tolerances.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
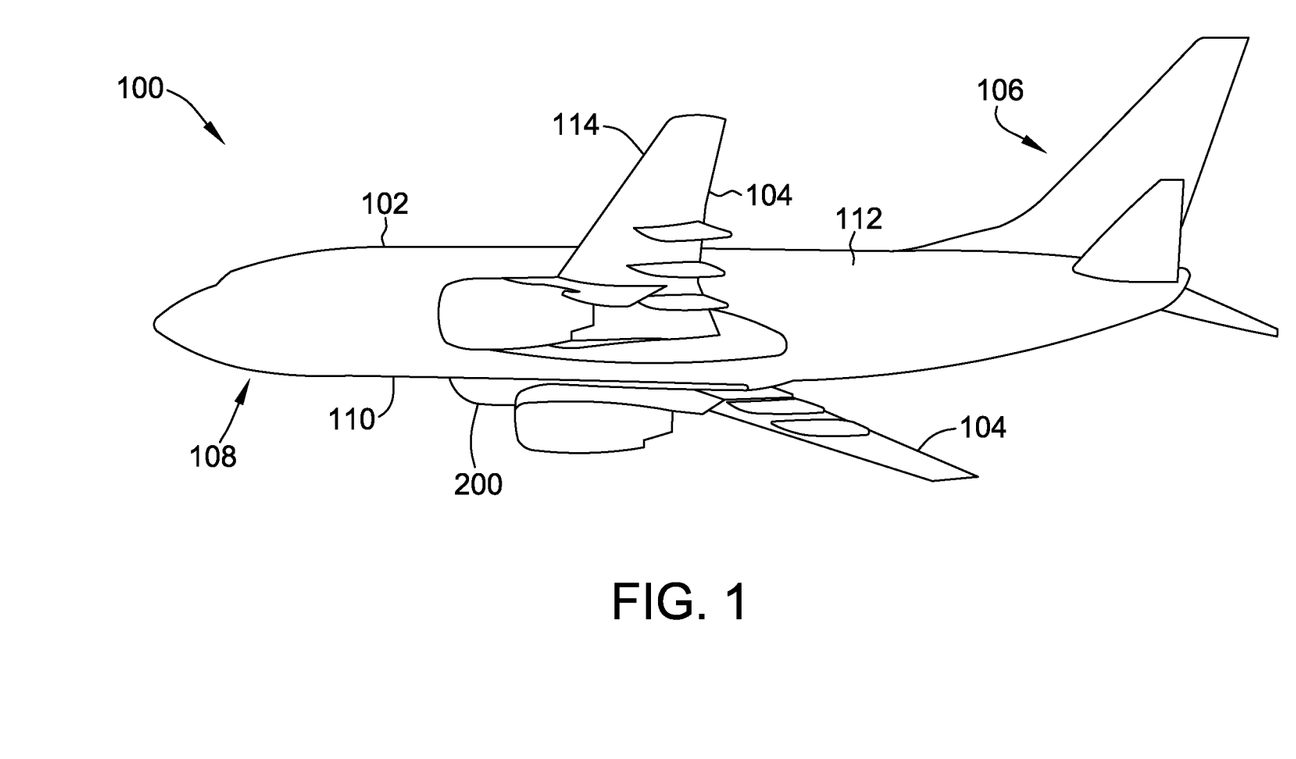
FIG. 1 is a perspective view of an exemplary aircraft having an external structure coupled thereto.

FIG. 1 is a perspective view of an exemplary aircraft 100 having an external structure 200 coupled thereto. Aircraft 100 includes a fuselage 102, a pair of wings 104, and an empennage 106. In the exemplary implementation, external structure 200 is coupled to a bottom surface 108 of fuselage 102. Alternatively, external structure 200 is coupled to any portion of aircraft 100, for example, wings 104 and empennage 106. More specifically, external structure 200 is coupled to a support structure of aircraft 100. In the exemplary embodiment, the support structure includes any of a keel beam 110, a bulkhead 112, and a wing spar 114. Hereinafter, keel beam 110 will be used as the support structure. Alternatively, the support structure is any structure of aircraft 100 capable of supporting external structure 200.

Figure 2:
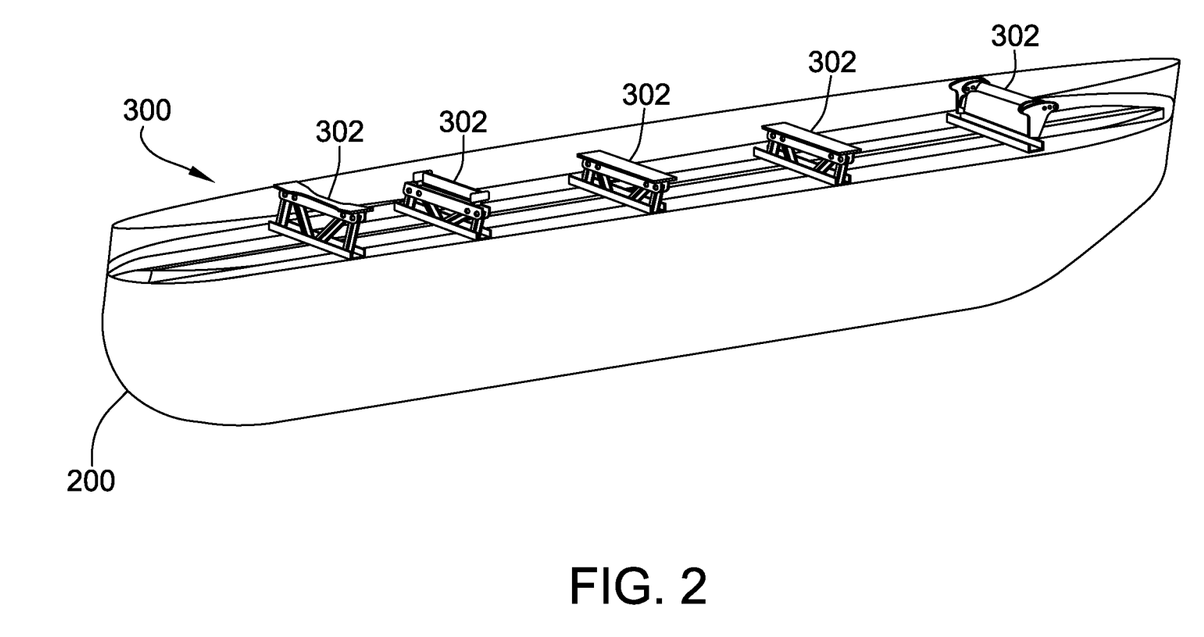
FIG. 2 is a perspective view of an exemplary mounting system that may be used to couple the external structure to the aircraft shown in FIG. 1.
Figure 3:
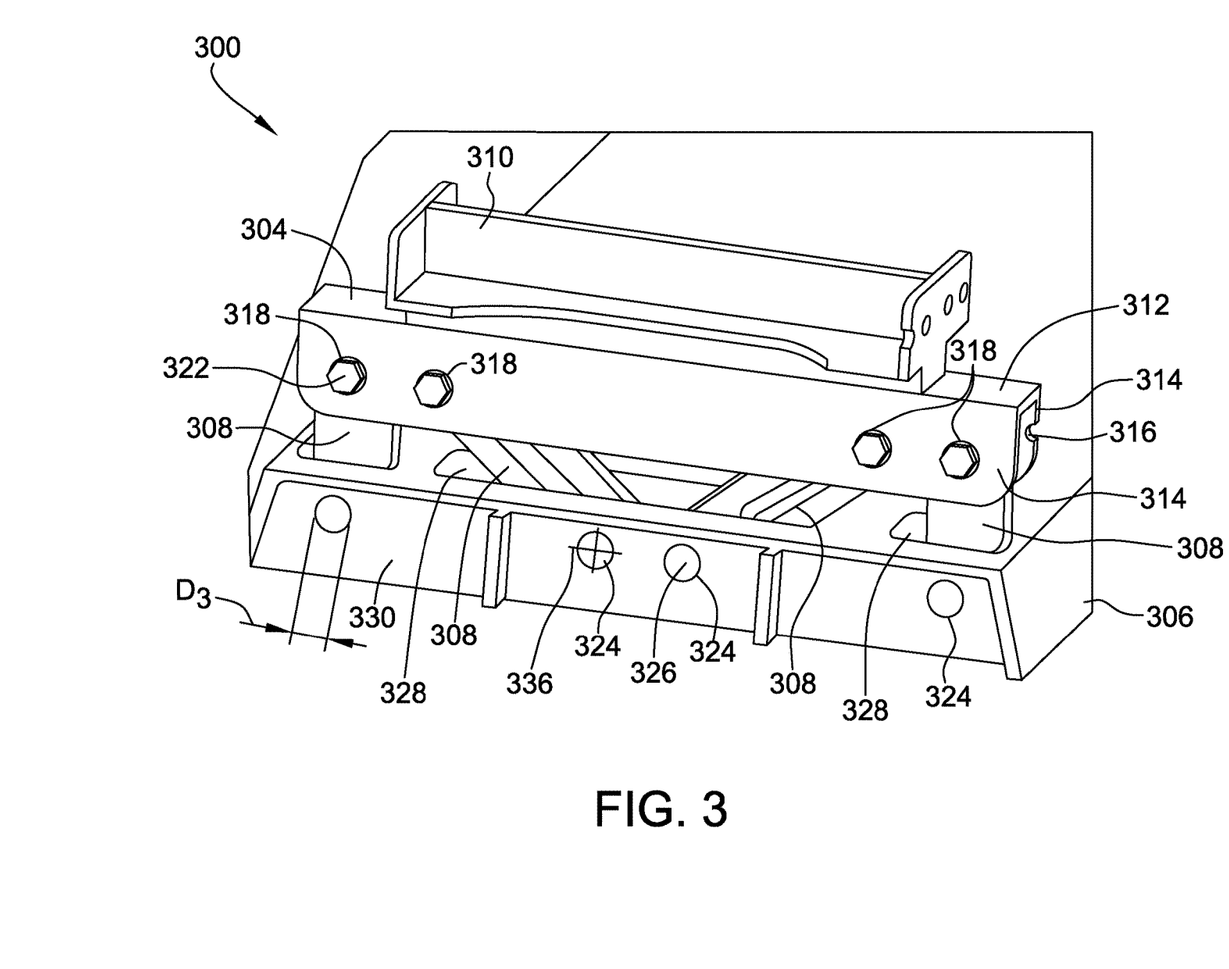
FIG. 3 is an enlarged perspective view of a portion of the mounting system.

FIG. 2 is a perspective view of an exemplary mounting system 300 used to couple external structure 200 to aircraft 100 (shown in FIG. 1). FIG. 3 is an enlarged perspective view of a portion of mounting system 300. External structure 200 is a large structure configured to carry a payload. For example, external structure 200 carries any of a sensor package, fuel, or other cargo as desired.

Figure 4:
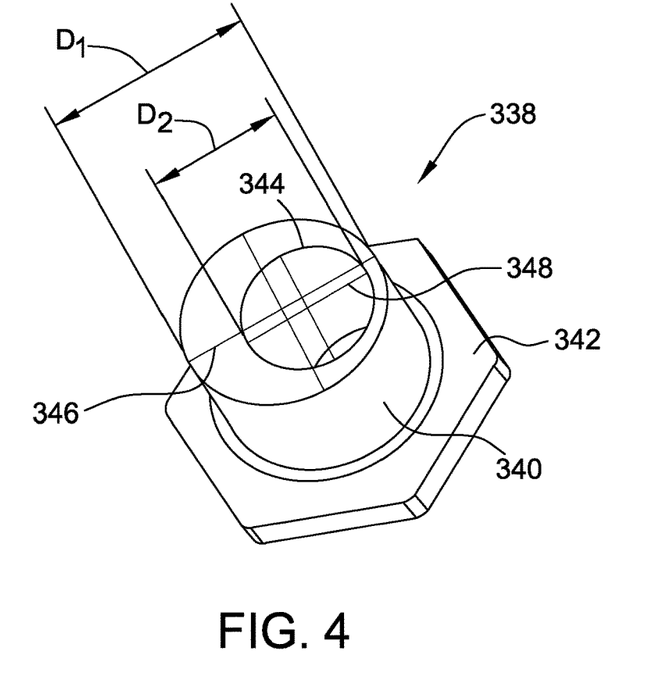
FIG. 4 is a perspective view of an exemplary link that may be used in the mounting system shown in FIG. 3.

In the exemplary implementation, mounting system 300 includes a plurality of mounting points 302 extending along a length of external structure 200 such that external structure 200 is coupled to support structure 110 (shown in FIG. 1) at multiple locations along its length. As shown in FIG. 3, mounting system 300 includes a plurality of first mounting structures 304, a second mounting structure 306, and a plurality of links 308 coupled therebetween. FIG. 4 is a perspective view of a single link 308 removed from mounting system 300. More specifically, in the exemplary implementation, each mounting point 302 includes a first mounting structure 304 coupled to support structure 110 and a plurality of links 308 coupled between first mounting structure 304 and second mounting structure 304. In the exemplary implementation, second mounting structure 304 is a continuous structure extending along the length of external structure 200 and coupled to each of mounting points 302. Alternatively, second mounting structure 306 includes a plurality of individual structures such that each mounting point 302 includes a respective second mounting structure 306.

In the exemplary implementation, first mounting structure 304 includes an aircraft mounting portion 310 coupled to aircraft support structure 110 and a link mounting portion 312 coupled to each of links 308. More specifically, link mounting portion 312 includes a clevis-shaped structure including a pair of legs 314 spaced apart by a gap 316 for receiving a link 308 therebetween. Each leg 314 includes an opening 318 aligned with a corresponding opening 318 on the opposing leg 314. In the exemplary implementation, openings 318 are at least partially aligned with a first link opening 320 such that a fastener 322 can be inserted therethrough.

Referring again to FIGS. 3 and 4, second mounting structure 306 includes at least one aperture 324 that at least partially aligns with a second link opening 326. More specifically, in the exemplary implementation, second mounting structure 306 includes a plurality of recesses 328 that each receive an end of a link 308 having second link opening 326. Each recess 328 is defined by at least one wall 330 having aperture 324 defined therethrough. Alternatively, second mounting structure 306 includes a single recess that receives the ends of each link 308. Still alternatively, second mounting structure 306 includes raised tabs that include aperture 324. Generally, second mounting structure 306 includes any features that facilitate operation of mounting system 300 as described herein.

As shown in FIG. 4, first link opening 320 includes a first central axis 332 and second link opening 326 includes a second central axis 334 that are separated by a length L. In the exemplary embodiment, length L varies between links 308 that are desired to be the same size. That is, because of manufacturing tolerances, the length L between openings 320 and 326 of one link 308 may be slightly different than that of a second link 308 when length L is actually desired to be consistent in every link 308. As such, when leg openings 318 on first mounting structure 304 are aligned with first link opening 320, second link opening 326 is offset from, that it, not perfectly aligned with, a central axis 336 of aperture 324 in second mounting structure 306.

Figure 5:
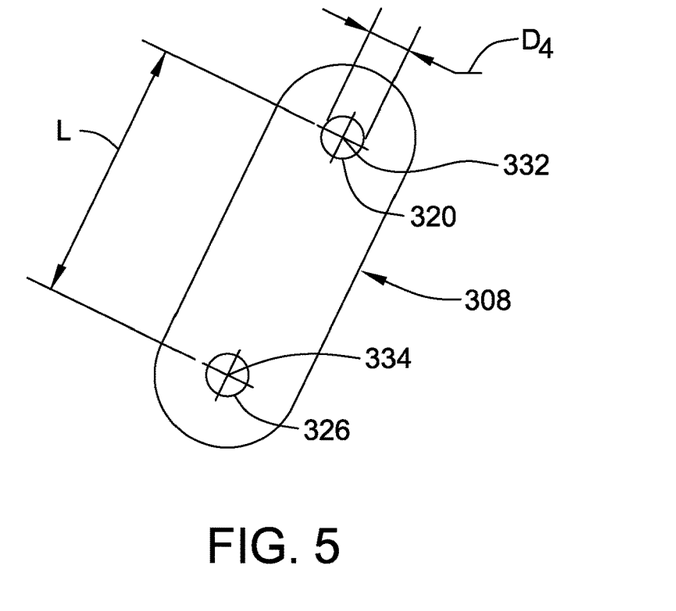
FIG. 5 is a perspective view of an exemplary eccentric bearing that may be used with the mounting system shown in FIG. 3.

FIG. 5 is a perspective view of an exemplary eccentric bearing 338 that may be used with mounting system 300. In the exemplary implementation, eccentric bearing 338 includes a shaft 340, an anti-rotation feature 342 coupled to shaft 340, and a bore 344 defined through shaft 340. Shaft 340 is the primary shaft of eccentric bearing 338 and includes a diameter D1 and a central axis 346. Similarly, bore 344 includes a diameter D2 and a central axis 348. In the exemplary implementation, bore central axis 348 is offset from shaft central axis 346 such that bore 34 and shaft 340 are not concentrically aligned.

Figure 6:
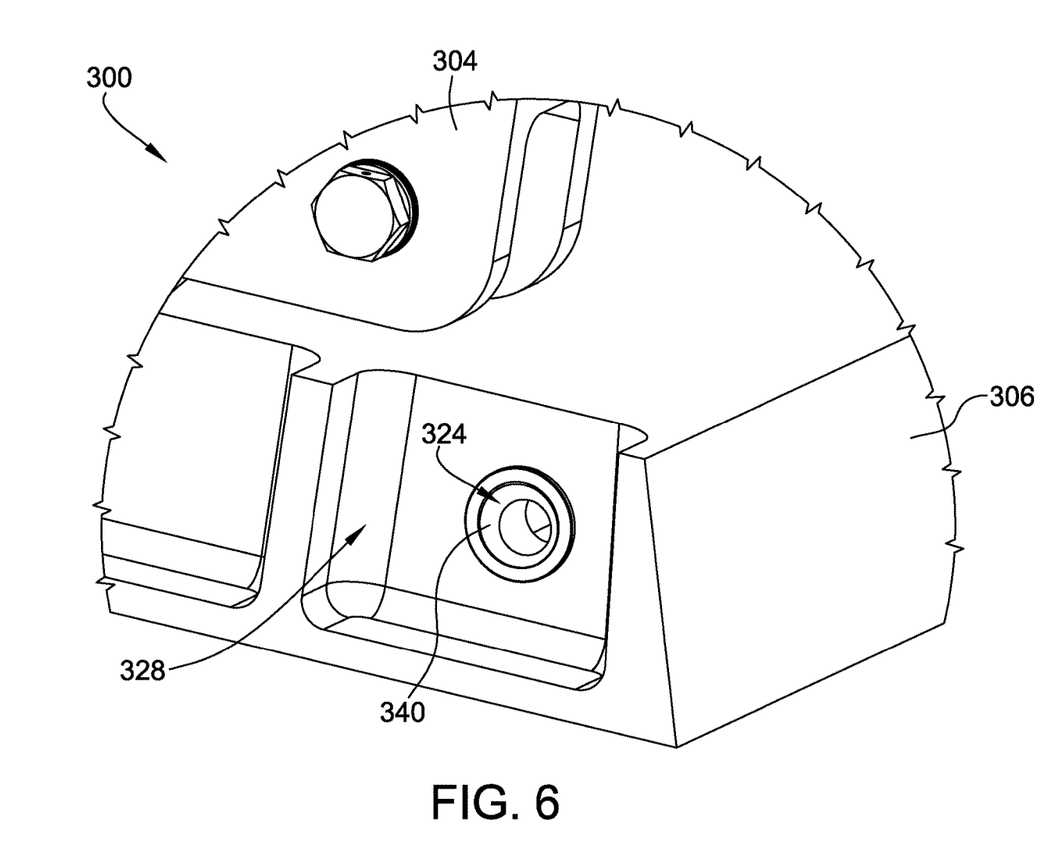
FIG. 6 is a front perspective view of a portion of the mounting system.
Figure 7:
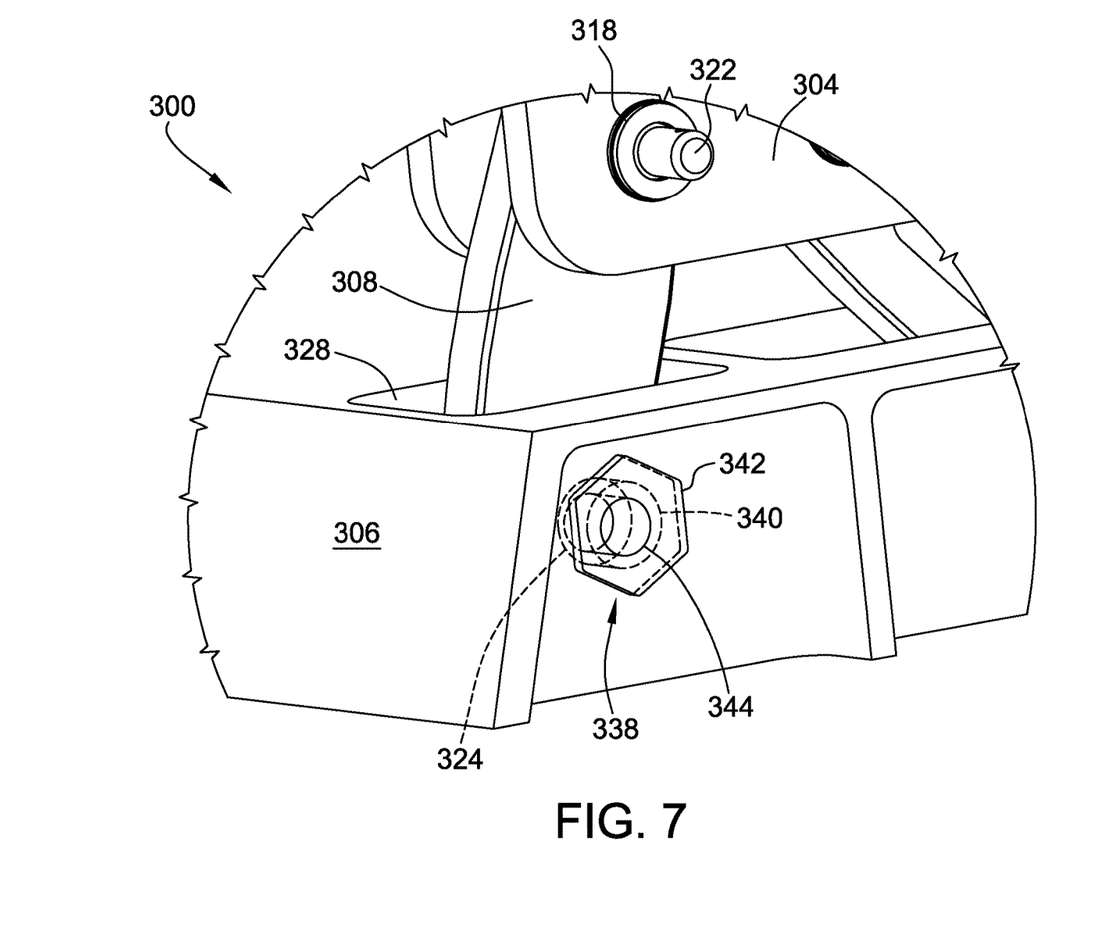
FIG. 7 is a rear perspective view of the portion of the mounting system shown in FIG. 6.
Figure 8:
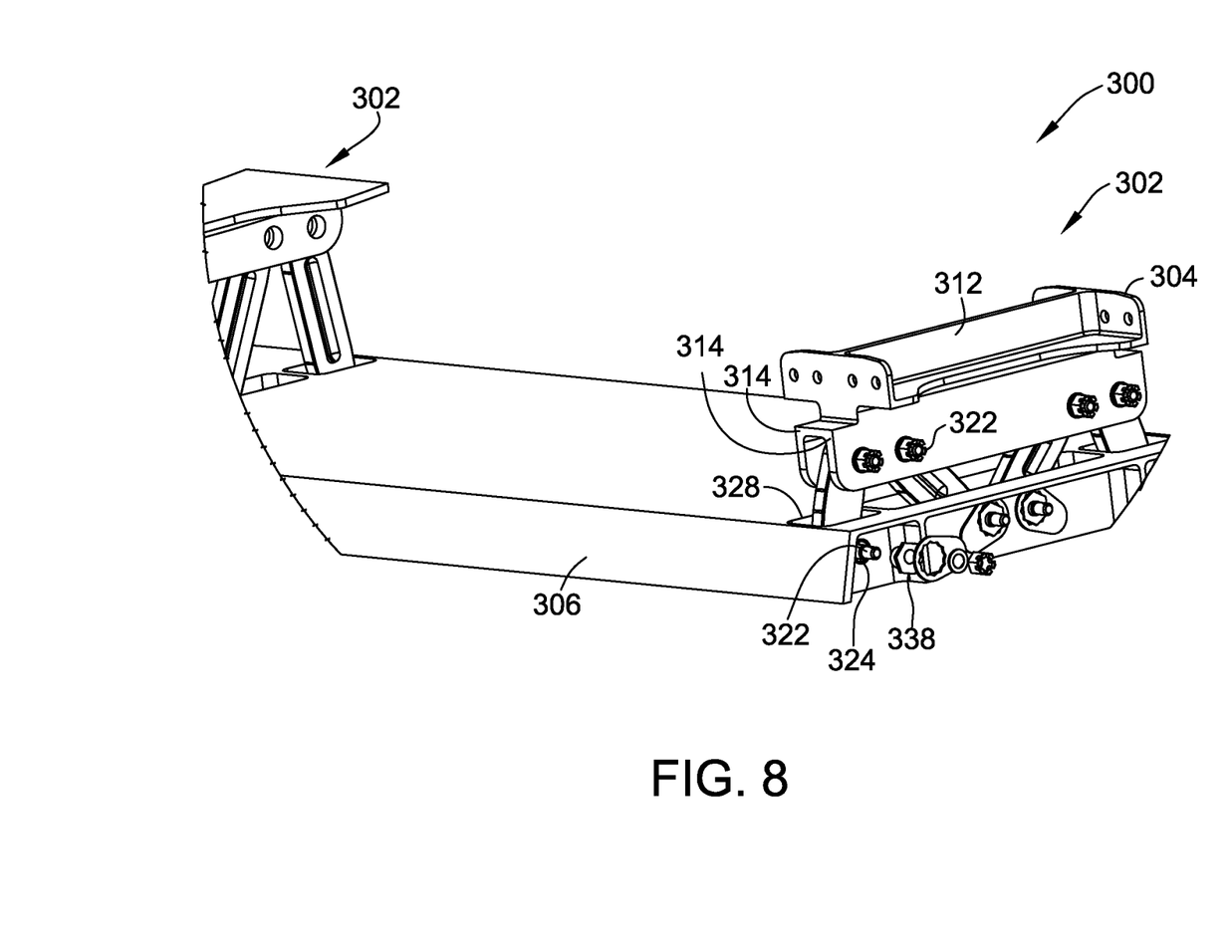
FIG. 8 is a perspective view of the assembled mounting system.

FIG. 6 is a front perspective view of a portion of mounting system 300. FIG. 7 is a rear perspective view of the portion of mounting system 300. FIG. 8 is a perspective view of the assembled mounting system 300. Link 308 is removed from FIGS. 6 and 7 for clarity. As shown in FIG. 6, eccentric bearing 338 is positioned within aperture 324 on second mounting structure 306 and operatively couples second mounting structure 306 to link 308, as best shown in FIG. 8. Because aperture 324 and second link opening 326 may not align to the degree required, eccentric bearing 338 is employed such that, once inserted into aperture 324, rotation of eccentric bearing 338 with respect to second mounting structure 306 facilitates aligning bore 344 with second link opening 326 to facilitate coupling link 308 with second mounting structure 306.

In operation, mounting system 300 is used to couple external structure 200 to aircraft 100 (both shown in FIG. 1). Initially, the plurality of first mounting structures 304 are coupled to support structure 110 of aircraft 100 at respective mounting points 302. Links 308 are then coupled to first mounting structures 304 by aligning openings 318 in legs 314 of first mounting structure 304 with first link opening 320 and inserting fastener 322 through aligned openings 318 and 320. Next, second mounting structure 306, having external structure 200 coupled thereto, is positioned proximate to links 308. Alternatively, external structure 200 is coupled to second mounting structure 306 after second mounting structure 306 is coupled to links 308.

As described above, because of manufacturing inconsistencies, the length L between openings 320 and 326 of one link 308 may be slightly different than that of a second link 308 when length L is actually desired to be consistent in every link 308. As such, when leg openings 318 on first mounting structure 304 are aligned with first link opening 320, second link opening 326 is offset from, that it, not perfectly aligned with, a central axis 336 of aperture 324 in second mounting structure 306. In the exemplary implementation, certain predetermined tolerances are required and the inconsistent lengths L between link openings 320 and 326 may result in opening 326 not be aligned enough with aperture 324 to meet the minimum requirements.

In the exemplary implementation, eccentric bearing 338 is then inserted into aperture 324 defined in second mounting structure 306. More specifically, shaft 340 of eccentric bearing 338, having bore 344 defined therethrough, is inserted into aperture 324. Eccentric bearings 338 are then rotated within aperture 324 such that bore 344 is substantially aligned with second link opening 326 within the specified tolerances. Accordingly, eccentric bearing 338 enables multi-dimensional adjustment of mounting system 300 to account for slightly different size links 308. Eccentric bearings 338 in each of openings 318 and 324 generates a fully adjustable mounting scheme where openings 318 and 324 locations location are effectively adjusted to accommodate fixed length links 308 extending from first mounting structure 304, effecting a three-dimensional adjustment of the mounting plane of external structure 200 with respect to the aircraft's 100 waterline.

Although eccentric bearing 338 is shown and described as being positioned within aperture 324 on second mounting structure 306 to align with second link opening 326, in an alternative implementation, eccentric bearings 338 are positioned in each of leg openings 318 of first mounting structure 304 to align with first link opening 320. Eccentric bearings 338 are positioned in openings 318 either in addition to, or in alternative of, bearings 338 in aperture 324.

In the exemplary implementation, aperture 324 includes a diameter D3 slightly larger than diameter D1 of shaft 340 to facilitate rotational engagement of eccentric bearing 338 within aperture 324. Similarly, bore diameter D2 is substantially similar to a diameter D4 of second link opening 326 to facilitate inserting a fastener 322 therethrough. As shown in FIG. 8, mounting assembly 300 also includes an anti-rotation device 350 coupled to anti-rotation feature 342 such that anti-rotation feature 342 prevent rotation of eccentric bearing 338, with respect to second mounting structure 306, within aperture 324. In the exemplary implementation, anti-rotation device 350 is a separate component coupled to anti-rotation feature 342 by fastener 322. Alternatively, anti-rotation feature 350 includes a feature integrated with either of eccentric bearing 338 or second mounting structure 306. Generally, anti-rotation feature 350 includes any feature that prevents rotation of eccentric bearing 338, with respect to second mounting structure 306, within aperture 324.

The implementations described herein include a mounting system for use in coupling an external structure, such as a sensor package, to an aircraft support structure, such as a keel beam, bulkhead, or wing rib. The mounting system includes a plurality of mounting points along the external structure. Each mounting point includes a first mounting structures coupled to the aircraft and at least one link coupled to the first mounting structure. The mounting system also includes a second mounting structure positioned proximate the at least one link and extending along the length of the external structure and plurality of mounting points, wherein the second mounting structure includes at least one aperture defined therein. The aperture is designed to align with a link opening to facilitate coupling the link and the second mounting structure, but, due to manufacturing limitations, the links may be slightly different sizes and, therefore, fall outside the acceptable tolerances ranges. An eccentric bearing is positioned in the at least one aperture and is configured to couple the second mounting structure to the at least one link. The eccentric bearing includes a bore extending therethrough that is offset from an axial center of the eccentric bearing such that when the eccentric bearing is rotated within the aperture, the bore aligns with the link opening and enables coupling of the second mounting structure with the links within the required tolerances.

As such, the mounting system described herein includes a process that accounts for the different link lengths and adjusts the position of various openings accordingly to account for differing link lengths and to satisfy certain tolerance requirements. Furthermore, because there are multiple mounting points along the length of the external structure, there are multiple locations where adjustments can be made to secure the external structure. As such, the mounting assembly described herein does not rely on the high precision placement of match-drilled holes for mounting the external structure, which prevents the simple removal and reinstallation enabled by the above described mounting system. Nor does the mounting system described herein rely on the use of adjustable length tie rods, which require significantly more space and weigh more than the links described herein. The mounting system described herein enables quick and simple installation, removal, and reinstallation of the external structure without having to pre-load the aircraft to align the openings perfectly and does so in a faster and more cost efficient manner.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is disposed by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting system for mounting an external structure to an aircraft, said mounting system comprising:
    a plurality of first mounting structures coupled to the aircraft;
    at least one link coupled to each first mounting structure of said plurality of first mounting structures;
    a second mounting structure positioned proximate said at least one link, said second mounting structure comprising at least one aperture defined therein;
    an eccentric bearing positioned within said aperture, said eccentric bearing comprising a shaft extending into said aperture and terminating short of said at least one link, wherein said shaft comprises a bore extending therethrough that is offset from an axial center of said eccentric bearing.

2. The mounting system in accordance with claim 1, wherein said at least one link comprises a link opening configured to align with said bore upon rotation of said eccentric bearing with respect to said second mounting structure.

3. The mounting system in accordance with claim 2, wherein said link opening is offset from an axial center of said aperture.

4. The mounting system in accordance with claim 2, wherein said bore includes a diameter substantially equal to a diameter of said link opening.

5. The mounting system in accordance with claim 2, further comprising a fastener configured for insertion through said bore and said link opening.

6. The mounting system in accordance with claim 1, wherein said aperture includes a diameter larger than a diameter of said eccentric bearing to facilitate rotational engagement of said eccentric bearing within said aperture.

7. The mounting system in accordance with claim 1, wherein said eccentric bearing comprises an anti-rotation feature configured to prevent rotation of said eccentric bearing with respect to said second mounting structure.

8. The mounting system in accordance with claim 7 further comprising an anti-rotation device coupled to said anti-rotation feature.

9. An aircraft comprising:
a support structure;
an external structure;
a mounting system configured to couple said external structure to said support structure, wherein said mounting system comprises:
a plurality of first mounting structures coupled to said support structure;
at least one link coupled to each first mounting structure of said plurality of first mounting structures;
a second mounting structure coupled to said external structure and positioned proximate said at least one link, said second mounting structure comprising at least one aperture defined therein;
an eccentric bearing positioned within said aperture, said eccentric bearing comprising a shaft extending into said aperture and terminating short of said at least one link, wherein said shaft comprises a bore extending therethrough that is offset from an axial center of said eccentric bearing.

10. The aircraft in accordance with claim 9, wherein said support structure comprises at least one of a keel beam, a bulkhead, and a wing rib.

11. The aircraft in accordance with claim 9, wherein said external structure comprises a sensor package.

12. The aircraft in accordance with claim 9, wherein said at least one link comprises a link opening configured to align with said bore upon rotation of said eccentric bearing with respect to said second mounting structure, wherein said link opening is offset from an axial center of said aperture.

13. The aircraft in accordance with claim 12 further comprising a fastener configured for insertion through said bore and said link opening.

14. A method of coupling an external structure to an aircraft using a mounting system, said method comprising:
coupling a plurality of first mounting structures to the aircraft;
coupling at least one link to each of the plurality of first mounting structures, wherein the at least one link includes a link opening;
positioning a second mounting structure proximate the at least one link, wherein the second mounting structure is coupled to the external structure, and wherein the second mounting structure includes at least one aperture defined therein;
inserting a shaft of an eccentric bearing into the at least one aperture such that the shaft terminates short of the at least one link, wherein the shaft includes a bore defined therethrough; and
rotating the eccentric bearing to align the bore with the link opening.

15. The method in accordance with claim 14 further comprising inserting a fastener through the bore and the link opening to facilitate coupling the link to the second mounting structure.

16. The method in accordance with claim 14 further comprising coupling an anti-rotation device to at least one of the eccentric bearing and the second mounting structure.

17. The method in accordance with claim 14, wherein positioning a second mounting structure proximate the at least one link comprises inserting at least a portion of the at least one link into a recess formed in the second mounting structure.

18. The method in accordance with claim 14, wherein positioning a second mounting structure proximate the at least one link comprises positioning the second mounting structure such that the link opening is offset from an axial center of the at least one aperture.

19. The method in accordance with claim 14, wherein coupling at least one link to each of the plurality of first mounting structures comprises:
positioning the at least one link between a pair of legs of the first mounting structure;
aligning an opening in each of the pair of legs with a second link opening in the least one link; and
inserting a fastener through the leg openings and the second link opening.

20. The method in accordance with claim 14, wherein coupling a plurality of first mounting structures to the aircraft comprises coupling the plurality of first mounting structures to at least one of a keel beam, a bulkhead, and a wing spar of the aircraft.

* * * * *